Dec. 21, 1965   F. GRAF   3,224,180
DEVICE FOR STOPPING THE DRIVE OF SPINDLES
OF SPINNING AND DOUBLING FRAMES
Filed Jan. 18, 1960

INVENTOR.
FELIX GRAF
BY
ATTORNEY.

United States Patent Office 3,224,180
Patented Dec. 21, 1965

3,224,180
DEVICE FOR STOPPING THE DRIVE OF SPINDLES OF SPINNING AND DOUBLING FRAMES
Felix Graf, Winterthur, Switzerland, assignor to Actiengesellschaft Joh. Jacob Reiter & Cie, Winterthur, Switzerland, a corporation of Switzerland
Filed Jan. 18, 1960, Ser. No. 3,016
Claims priority, application Switzerland, Jan. 23, 1959, 68,691
12 Claims. (Cl. 57—88)

The present invention relates to a device for stopping the drive of spindles of spinning and doubling frames.

Devices for stopping the drive of spindles of spinning and doubling frames are known requiring separation of the driving belt from the spindle whirl so that there is no driving connection between these two elements. Since the belt remains on the driving pulley, it continues to run and slides on the element which separates the belt from the whirl during the entire standstill period of the spindle so that the belt is quickly worn. In these conventional devices good sliding characteristics of the belt are desired so that the belt cannot have very good adhesion characteristics which are desired for preventing slippage during normal driving conditions. A compromise must be made for these contradicting requirements so that the conventional apparatus can never operate at optimal conditions. In devices in which the driving belt is lifted from the spindle whirl, rotation of the spindle must be stopped either by hand or by a special brake after the belt has been separated from the whirl.

It is an object of the present invention to provide a device for stopping the drive of spindles of spinning and doubling frames, in which the whirls of the individual spindles are driven by individual endless driving belts which extend around the whirl and a tensioning pulley and are in driving engagement with a rotating driving pulley, the device including means for lifting the driving belt from the driving pulley.

With the arrangement according to the invention, there is sliding engagement during very brief periods only, between the driving belt and an element which lifts it from the driving pulley for stopping the spindle drive because, when the belt is disengaged from the driving pulley, movement of the belt stops already after a few revolutions of the spindle. The system according to the invention permits use of a belt which has very good adhesion characteristics which considerably improves the driving operation.

The novel features which are considered characteristic of the invention are set forth with particularity in the appended claims. The invention itself, however, and additional objects and advantages thereof will best be understood from the following description of embodiments thereof when read in connection with the accompanying drawing, in which:

Figure 1:
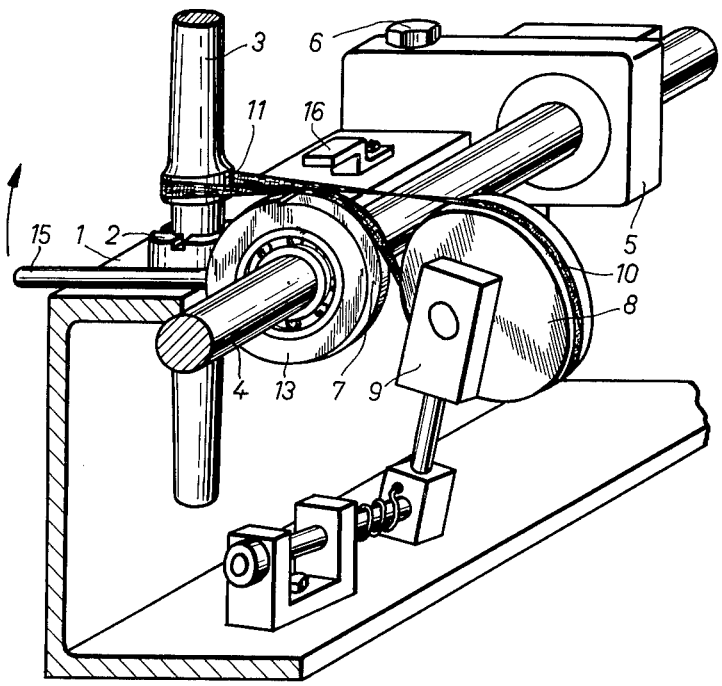
FIG. 1 is a perspective illustration of a portion of a spindle frame provided with a device according to the invention which is shown in inactive position.

Referring more particularly to the drawing, numeral 1 designates a spindle frame to which a lower portion 2 of a spindle is screwed in the conventional manner and rotatably supports an upper portion 3 of the spindle. A driving shaft 4 is placed in parallel relation to the spindle frame 1 close to the spindles and is rotatably supported by supports 5 of which only one is shown. The supports 5 are connected by screws 6 to the spindle frame 1. A driving pulley 7 rigidly connected to the shaft 4 is associated with each spindle. A tension pulley 8 is freely rotatable on a lever 9 which is acted upon by a spring to urge the pulley 8 to a position in which a belt 10 extending around a whirl 11 on the spindle portion 3 and having a run resting on the driving pulley 7, which is located between the spindle and the tensioning pulley, is tensioned. The angle of encirclement of the run engaging the driving pulley is more or less below 90°. An inner race of a ball bearing is rigidly connected to the shaft 4 adjacent to the driving pulley 7. The outer race 12 of the ball bearing supports a disc 13 which has a part-cylindrical lateral extension 14 (FIG. 2) which is coaxial of the shaft 4 and which extends over about one quarter of the periphery of the driving pulley 7. A handle 15 is mounted on the extension 14. Angular movement of this lever is limited by the spindle frame 1 and an angular member 16 mounted on the spindle frame.

Instead of providing a ball bearing on the shaft 4 for supporting the disc 13 provided with the axial part-cylindrical extension 14, the element 13, 14 may be rotatable on a sleeve coaxial of and radially spaced from the shaft 4 and rigidly connected to the spindle frame 1 whereby a high-speed bearing is made unnecessary.

Figure 2:
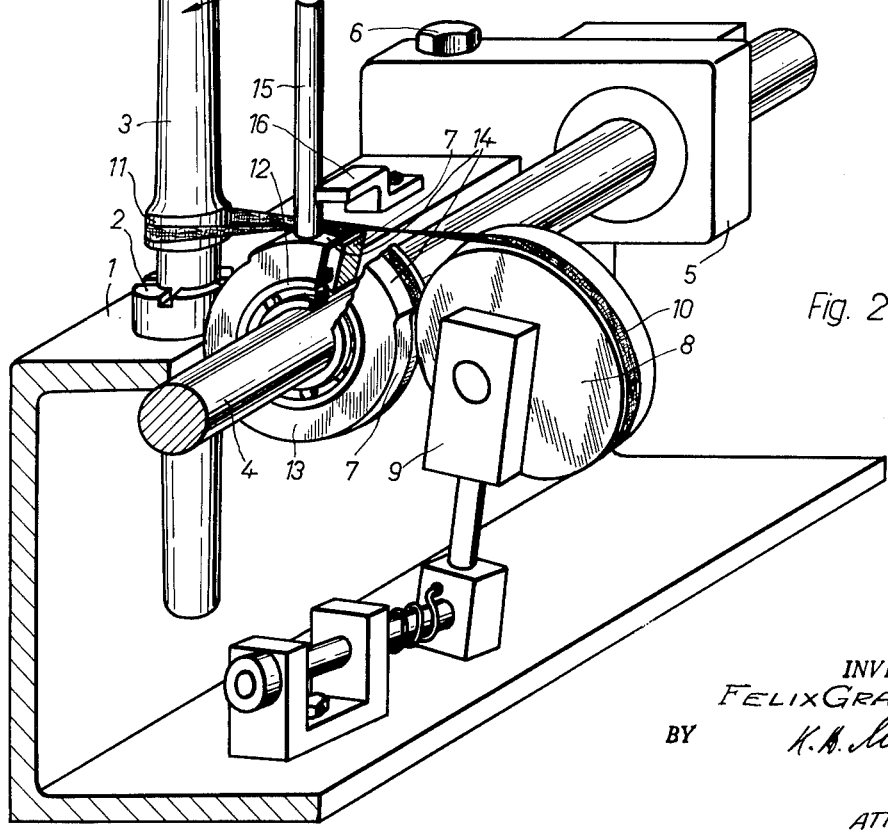
FIG. 2 is a perspective part sectional illustration of the apparatus shown in FIG. 1 with the device in active position whereby the driving belt is disengaged from the driving pulley.

The device according to the invention operates as follows:

By counterclockwise swinging the lever or handle 15 from the position shown in FIG. 2 to the position shown in FIG. 1 in which the handle abuts against the spindle frame, the belt lifting surface portion 14 of the element 13, 14 is disengaged from the belt so that the latter can rest on the driving pulley 7 to be driven thereby. If it is desired to stop the drive of the spindle, the handle 15 is moved clockwise from the position shown in FIG. 1 to the position shown in FIG. 2 in which the handle abuts the angular member 16. The cylindrical extension 14 of the disc 13 is thereby moved between the driving pulley 7 and the run of the belt 10 which is normally engaged by the driving pulley. The belt 10 is now lifted from the driving pulley so that there is no drive of the spindle part 3. The belt now sliding on the surface 14 is retarded and stops after a few revolutions of the spindle so that the spindle as well as the tensioning pulley are stopped. There is no wear of the belt because it slides for very short periods only on the surface 14, in contradistinction to conventional devices in which the belt is continuously drivin also when the belt is disengaged from the spindle whirl. For this reason, it is possible to use belts having properties assuring excellent adhesion between the driven parts and the driving part of the apparatus.

I claim:

1. In combination with a drive for a spindle of a spinning or doubling frame including a driving pulley, a tensioning pulley, a whirl on said spindle, and an endless belt extending around said whirl and said tensioning pulley and having a run in driving engagement with said driving pulley, a belt lifting means having a part-cylindrical portion coaxial of said driving pulley and swingably supported to swing on the rotation axis of said driving pulley between an inactive position in which said part-cylindrical portion is disengaged from said belt and an active position in which said portion is interposed between said driving pulley and said belt for lifting the latter from said driving pulley and stopping the drive of the spindle by said belt.

2. In the combination set forth in claim 1, a drive shaft, said driving pulley being fast on said drive shaft, and said belt lifting means being rotatably supported by said drive shaft.

3

3. In combination with a belt drive for a spindle of a spinning or doubling frame including a driving pulley having a belt-engaging surface, a tensioning pulley, a whirl on said spindle, and an endless belt extending around said whirl and said tensioning pulley and having a run in driving engagement with said surface of said driving pulley, a belt removing means mounted adjacent said driving pulley to rotate around the rotation axis of said driving pulley, and means for selectively rotating said belt removing means to an idle position wherein said belt removing means is disengaged from said belt and to an active position wherein said removing means is temporarily interposed between said surface of said driving pulley and said belt and frictionally engages and removes said belt from said driving pulley for interrupting the drive of said belt by said driving pulley.

4. In combination with a belt drive for a spindle of a spinning or doubling frame including a driving pulley having a belt-engaging surface, a tensioning pulley, a whirl on said spindle, and an endless belt extending around said whirl and said tensioning pulley and having a run in driving engagement with said surface of said driving pulley, and a belt lifting means rotatable coaxially with and in the plane of said driving pulley which plane includes the run of said belt which run is in driving engagement with said surface of said driving pulley, for temporarily interposing said belt lifting means between said surface of said driving pulley and said belt for lifting the latter from the driving pulley and interrupting the drive of the spindle by said belt.

5. In a spinning or twisting machine having a frame, a plurality of spindles rotatably mounted on said frame parallel to each other, a common drive shaft extending transverse to said spindles, a plurality of drive pulleys on said shaft, a plurality of idler pulleys each associated with one of said drive pulleys and one of said spindles, an individual flat driving belt for each of said spindles connecting each of said spindles with one of said idler pulleys and normally engaging with one of said drive pulleys to rotate said spindle, and means for disengaging said belt from said drive pulley and for then receiving said belt so as to stop the rotation of said spindle, said idler pulleys, spindles, and drive pulleys comprising outer peripheral belt-engaging surfaces, said belt-engaging means comprising a belt-disengaging member extending substantially transversely of, but spaced from, said peripheral belt-engaging surface of said drive pulley, and means for moving said member in an arcuate path from a first position out of engagement with said belt to a second position between said outer peripheral belt-engaging surface of said drive pulley and said belt and in engagement with said belt to disengage said belt completely from said drive pulley.

6. The combination according to claim 5, in which said member has a curved elongated shape, the curvature of said belt-engaging surface of said member extending in the peripheral direction of said drive pulley.

7. The combination according to claim 5, in which said member forms a cylindrical segment having a center of curvature substantially coaxial with said drive pulley, said means for moving said member comprising means for turning said member in the peripheral direction about said drive pulley to lift said belt from said drive pulley.

8. The combination according to claim 5, in which said means for moving said member comprises a control rod connected to said member for manipulating the same.

9. The combination according to claim 5, in which said belt and said belt-disengaging member cooperate to comprise friction-producing means for quickly stopping the rotation of said spindle when said belt is disengaged from said drive pulley.

10. In combination with a belt drive for a spindle of a spinning or doubling frame including a driving pulley having a belt-engaging surface, a tensioning pulley, a whirl on said spindle, and an endless belt extending around said whirl and said tensioning pulley and having a run in driving engagement with said surface of said driving pulley, and a belt lifting means movable in the plane of said driving pulley which plane includes the run of said belt which run is in driving engagement with said surface of said driving pulley, said belt lifting means being rotatable around the rotation axis of said driving pulley and having a part-cylindrical surface coaxial of the rotation axis of the driving pulley and being temporarily interposed between said belt and the belt-engaging surface of said driving pulley upon movement of said belt lifting means for lifting the belt from the driving pulley and interrupting the drive of the spindle by the belt.

11. In combination with a belt drive for a spindle of a spinning or doubling frame including a driving pulley having a belt-engaging surface, a tensioning pulley, a whirl on said spindle, and an endless belt extending around said whirl and said tensioning pulley and having a run in driving engagegement with said surface of said driving pulley, and a belt lifting means movable in the plane of said driving pulley which plane includes the run of said belt which run is in driving engagement with said surface of said driving pulley, for temporarily interposing said belt lifting means between said surface of said driving pulley and said belt for lifting the latter from the driving pulley and interrupting the drive of the spindle by said belt, said belt lifting means being rotatable around the rotation axis of said driving pulley and having a part-cylindrical surface coaxial of said rotation axis and engaging said belt when said belt lifting means is interposed between the surface of said driving pulley and said belt, the axial extension of said part-cylindrical surface being at least equal to the axial extension of said surface of said driving pulley.

12. In combination with a belt drive for a spindle of a spinning or doubling frame including a driving pulley having a belt-engaging surface, a tensioning pulley, a whirl on said spindle, and an endless belt extending around said whirl and said tensioning pulley and having a run in driving engagement with said surface of said driving pulley, and a belt lifting means movable in the plane of said driving pulley which plane includes the run of said belt which run is in driving engagement with said surface of said driving pulley, for temporarily interposing said belt lifting means between said surface of said driving pulley and said belt for lifting the latter from the driving pulley and interrupting the drive of the spindle by said belt, said belt lifting means being rotatable around the rotation axis of said driving pulley and having a part-cylindrical surface coaxial of said rotation axis and engaging said belt when said belt lifting means is interposed between the surface of said driving pulley and said belt, said part-cylindrical surface being in axial direction substantially coextensive with said surface of said driving pulley.

References Cited by the Examiner

UNITED STATES PATENTS

| 108,379 | 10/1870 | Mutchler | 74—242.5 |
| 731,272 | 6/1903 | Bradley | 57—105 |
| 2,869,317 | 1/1959 | Schurr et al. | 57—105 |

FOREIGN PATENTS 483,959    4/1938   Great Britain.

OTHER REFERENCES

Mortl: German application, 1,015,294, printed September 5, 1957 (Kl. 47h–9), (1 sht. dwg., 2 pp. spec.).

Mortl: German application, 1,042,331, printed October 30, 1958 (Kl. 47h–9) (1 sht. dwg., a p. spec.).

MERVIN STEIN, *Primary Examiner.*

RUSSELL C. MADER, *Examiner.*